United States Patent
Johnsen et al.

(10) Patent No.: US 9,240,981 B2
(45) Date of Patent: Jan. 19, 2016

(54) SYSTEM AND METHOD FOR AUTHENTICATING IDENTITY OF DISCOVERED COMPONENT IN AN INFINIBAND (IB) NETWORK

(75) Inventors: Bjørn-Dag Johnsen, Oslo (NO); Predrag Hodoba, Heggedal (NO); Ola Tørudbakken, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 53 days.

(21) Appl. No.: 13/488,040

(22) Filed: Jun. 4, 2012

(65) Prior Publication Data

US 2012/0311333 A1 Dec. 6, 2012

Related U.S. Application Data

(60) Provisional application No. 61/493,330, filed on Jun. 3, 2011.

(51) Int. Cl.
| | |
|---|---|
| H04L 29/06 | (2006.01) |
| H04L 9/32 | (2006.01) |
| H04L 12/24 | (2006.01) |
| H04L 12/931 | (2013.01) |

(52) U.S. Cl.
CPC .......... *H04L 63/0442* (2013.01); *H04L 9/3234* (2013.01); *H04L 9/3271* (2013.01); *H04L 41/12* (2013.01); *H04L 49/20* (2013.01); *H04L 63/083* (2013.01); *H04L 63/0876* (2013.01)

(58) Field of Classification Search
CPC .......................... H04L 63/0442; H04L 9/3271
See application file for complete search history.

(56) References Cited

U.S. PATENT DOCUMENTS

| | | | |
|---|---|---|---|
| 5,805,805 | A | 9/1998 | Civanlar et al. |
| 5,964,837 | A | 10/1999 | Chao |
| 6,282,678 | B1 | 8/2001 | Snay |
| 6,314,531 | B1 | 11/2001 | Kram |
| 6,463,470 | B1 | 10/2002 | Mohaban |

(Continued)

FOREIGN PATENT DOCUMENTS

| | | |
|---|---|---|
| CN | 1514625 | 7/2004 |
| CN | 1567827 | 1/2005 |

(Continued)

OTHER PUBLICATIONS

International Search Report dated Sep. 26, 2013 for Application No. PCT/US2013/040656, 10 pages.

(Continued)

*Primary Examiner* — Victor Lesniewski
(74) *Attorney, Agent, or Firm* — Tucker Ellis LLP

(57) ABSTRACT

A system and method can verify trustfulness of a fabric component in an InfiniBand (IB) fabric. A subnet manager that is responsible for authenticating the fabric component using private/public key pairs. The subnet manager can first send a first encrypted message to a fabric component in the IB fabric, wherein the first encrypted message contains a token and is encrypted using a public key associated with the fabric component. Then, the fabric component is allowed to decode the first encrypted message using a private key associated with the fabric component, and to send a second encrypted message back to the subnet manager. Finally, the subnet manager can authenticate the fabric component if the second encrypted message contains correct information.

19 Claims, 3 Drawing Sheets

(56) References Cited

U.S. PATENT DOCUMENTS

| | | | |
|---|---|---|---|
| 6,594,759 B1* | 7/2003 | Wang | 713/182 |
| 6,647,419 B1 | 11/2003 | Mogul | |
| 6,678,835 B1 | 1/2004 | Shah | |
| 6,697,360 B1 | 2/2004 | Gai | |
| 6,748,429 B1 | 6/2004 | Talluri et al. | |
| 6,829,685 B2* | 12/2004 | Neal et al. | 711/153 |
| 6,904,545 B1* | 6/2005 | Erimli et al. | 714/43 |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1 | 12/2005 | Frazier et al. | |
| 6,985,956 B2 | 1/2006 | Luke et al. | |
| 7,023,795 B1 | 4/2006 | Hwu | |
| 7,023,811 B2* | 4/2006 | Pinto | 370/254 |
| 7,069,468 B1 | 6/2006 | Olson | |
| 7,113,995 B1 | 9/2006 | Beukema | |
| 7,185,025 B2 | 2/2007 | Rosenstock et al. | |
| 7,194,540 B2* | 3/2007 | Aggarwal et al. | 709/225 |
| 7,200,704 B2 | 4/2007 | Njoku et al. | |
| 7,216,163 B2 | 5/2007 | Sinn | |
| 7,231,518 B1 | 6/2007 | Bakke | |
| 7,290,277 B1 | 10/2007 | Chou et al. | |
| 7,302,484 B1 | 11/2007 | Stapp | |
| 7,356,841 B2 | 4/2008 | Wilson et al. | |
| 7,398,394 B1* | 7/2008 | Johnsen et al. | 713/168 |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,633,955 B1 | 12/2009 | Saraiya et al. | |
| 7,634,608 B2 | 12/2009 | Droux et al. | |
| 7,685,385 B1 | 3/2010 | Choudhary et al. | |
| 7,724,748 B2 | 5/2010 | Davis | |
| 7,783,788 B1* | 8/2010 | Quinn et al. | 710/8 |
| 7,843,822 B1 | 11/2010 | Paul | |
| 7,860,961 B1 | 12/2010 | Finkelstein et al. | |
| 7,873,711 B2 | 1/2011 | Adams et al. | |
| 8,184,555 B1 | 5/2012 | Mouton | |
| 8,234,407 B2 | 7/2012 | Sugumar | |
| 8,291,148 B1 | 10/2012 | Shah et al. | |
| 8,327,437 B2 | 12/2012 | McAlister | |
| 8,331,381 B2 | 12/2012 | Brown et al. | |
| 8,335,915 B2* | 12/2012 | Plotkin et al. | 713/150 |
| 8,423,780 B2* | 4/2013 | Plotkin et al. | 713/182 |
| 8,549,281 B2 | 10/2013 | Samovskiy et al. | |
| 8,583,921 B1* | 11/2013 | Shu | 713/168 |
| 8,924,952 B1 | 12/2014 | Hou | |
| 8,972,966 B2 | 3/2015 | Kelso | |
| 2002/0059597 A1 | 5/2002 | Kikinis et al. | |
| 2002/0120720 A1 | 8/2002 | Moir | |
| 2002/0188711 A1 | 12/2002 | Meyer | |
| 2003/0009487 A1 | 1/2003 | Prabakaran et al. | |
| 2003/0009551 A1 | 1/2003 | Benfield | |
| 2003/0065775 A1 | 4/2003 | Aggarwal | |
| 2003/0079040 A1 | 4/2003 | Jain | |
| 2003/0093509 A1 | 5/2003 | Li et al. | |
| 2003/0105903 A1 | 6/2003 | Garnett et al. | |
| 2003/0120852 A1 | 6/2003 | McConnell et al. | |
| 2003/0208572 A1 | 11/2003 | Shah | |
| 2004/0022245 A1 | 2/2004 | Forbes | |
| 2004/0031052 A1 | 2/2004 | Wannamaker | |
| 2004/0037279 A1 | 2/2004 | Zelig et al. | |
| 2004/0123142 A1 | 6/2004 | Dubal et al. | |
| 2004/0153849 A1 | 8/2004 | Tucker | |
| 2004/0162973 A1 | 8/2004 | Rothman | |
| 2004/0193768 A1 | 9/2004 | Carnevale | |
| 2004/0199764 A1* | 10/2004 | Koechling et al. | 713/155 |
| 2004/0220947 A1 | 11/2004 | Aman | |
| 2004/0249928 A1 | 12/2004 | Jacobs et al. | |
| 2004/0255286 A1 | 12/2004 | Rothman | |
| 2005/0044363 A1* | 2/2005 | Zimmer et al. | 713/170 |
| 2005/0071382 A1 | 3/2005 | Rosenstock | |
| 2005/0071709 A1 | 3/2005 | Rosenstock | |
| 2005/0091396 A1 | 4/2005 | Nilakantan et al. | |
| 2005/0105554 A1 | 5/2005 | Kagan et al. | |
| 2005/0125520 A1 | 6/2005 | Hanson | |
| 2005/0182701 A1 | 8/2005 | Cheston | |
| 2005/0182831 A1 | 8/2005 | Uchida | |
| 2005/0182853 A1 | 8/2005 | Lewites et al. | |
| 2005/0198164 A1 | 9/2005 | Moore | |
| 2005/0198250 A1 | 9/2005 | Wang | |
| 2005/0213608 A1 | 9/2005 | Modi | |
| 2005/0273641 A1 | 12/2005 | Sandven et al. | |
| 2006/0079278 A1 | 4/2006 | Ferguson et al. | |
| 2006/0117103 A1 | 6/2006 | Brey | |
| 2006/0136735 A1 | 6/2006 | Plotkin | |
| 2006/0195560 A1 | 8/2006 | Newport | |
| 2006/0221975 A1 | 10/2006 | Lo | |
| 2006/0233168 A1 | 10/2006 | Lewites | |
| 2007/0016694 A1 | 1/2007 | Achler | |
| 2007/0050763 A1 | 3/2007 | Kagan | |
| 2007/0110245 A1 | 5/2007 | Sood | |
| 2007/0129917 A1 | 6/2007 | Blevins | |
| 2007/0195794 A1 | 8/2007 | Fujita | |
| 2007/0206735 A1 | 9/2007 | Silver | |
| 2007/0253328 A1 | 11/2007 | Harper | |
| 2008/0031266 A1 | 2/2008 | Tallet et al. | |
| 2008/0144614 A1 | 6/2008 | Fisher | |
| 2008/0159277 A1 | 7/2008 | Vobbilisetty et al. | |
| 2008/0183853 A1 | 7/2008 | Manion et al. | |
| 2008/0192750 A1 | 8/2008 | Ko | |
| 2008/0201486 A1 | 8/2008 | Hsu | |
| 2008/0209018 A1 | 8/2008 | Hernandez | |
| 2008/0229096 A1 | 9/2008 | Alroy | |
| 2008/0250125 A1 | 10/2008 | Brey et al. | |
| 2008/0310422 A1 | 12/2008 | Booth | |
| 2009/0049164 A1 | 2/2009 | Mizuno | |
| 2009/0116404 A1 | 5/2009 | Mahop | |
| 2009/0141728 A1 | 6/2009 | Brown | |
| 2009/0178033 A1 | 7/2009 | Challener | |
| 2009/0216853 A1* | 8/2009 | Burrow et al. | 709/208 |
| 2009/0307499 A1* | 12/2009 | Senda | H04L 9/0861 713/187 |
| 2009/0327462 A1 | 12/2009 | Adams et al. | |
| 2010/0020806 A1 | 1/2010 | Vahdat | |
| 2010/0080117 A1 | 4/2010 | Coronado | |
| 2010/0082853 A1* | 4/2010 | Block et al. | 710/33 |
| 2010/0138532 A1 | 6/2010 | Glaeser et al. | |
| 2010/0142544 A1 | 6/2010 | Chapel | |
| 2010/0166167 A1 | 7/2010 | Karimi-Cherkandi | |
| 2010/0235488 A1 | 9/2010 | Sharma | |
| 2010/0268857 A1 | 10/2010 | Bauman | |
| 2010/0306772 A1 | 12/2010 | Arnold | |
| 2011/0072206 A1 | 3/2011 | Ross et al. | |
| 2011/0110366 A1 | 5/2011 | Moore | |
| 2011/0138082 A1 | 6/2011 | Khatri | |
| 2011/0138185 A1* | 6/2011 | Ju | G06F 21/10 713/171 |
| 2011/0173302 A1 | 7/2011 | Rider | |
| 2011/0209202 A1 | 8/2011 | Otranen | |
| 2011/0222492 A1 | 9/2011 | Borsella | |
| 2011/0264577 A1 | 10/2011 | Winbom | |
| 2012/0005480 A1* | 1/2012 | Batke | G06F 21/572 713/175 |
| 2012/0039331 A1 | 2/2012 | Astigarraga | |
| 2012/0195417 A1 | 8/2012 | Hua | |
| 2012/0239928 A1* | 9/2012 | Judell | H04L 9/30 713/168 |
| 2012/0290698 A1 | 11/2012 | Alroy | |
| 2013/0041969 A1* | 2/2013 | Falco et al. | 709/212 |
| 2013/0046904 A1 | 2/2013 | Hilland | |
| 2013/0138836 A1 | 5/2013 | Cohen et al. | |
| 2013/0159865 A1 | 6/2013 | Smith | |
| 2013/0179870 A1 | 7/2013 | Kelso | |
| 2013/0191622 A1 | 7/2013 | Sasaki | |
| 2014/0095853 A1 | 4/2014 | Sarangshar | |
| 2014/0095876 A1* | 4/2014 | Smith | H04L 9/3265 713/171 |

FOREIGN PATENT DOCUMENTS

| | | |
|---|---|---|
| CN | 1728664 | 1/2006 |
| CN | 101123498 A | 2/2008 |
| EP | 1 128 607 A2 | 8/2001 |

(56) References Cited

FOREIGN PATENT DOCUMENTS

| EP | 2 051 436 A1 | 4/2009 |
|----|--------------|--------|
| EP | 2160068 A1 | 3/2010 |
| JP | 2002247089 | 8/2002 |
| JP | 2004166263 | 6/2004 |
| JP | 2005522774 | 7/2005 |
| JP | 2006157285 | 6/2006 |
| JP | 2007501563 | 1/2007 |
| JP | 200854214 | 3/2008 |
| JP | 2009510953 | 3/2009 |
| WO | 01/90838 A2 | 11/2001 |
| WO | 03088050 | 10/2003 |
| WO | 2006016698 | 2/2006 |
| WO | 2008099479 | 8/2008 |
| WO | 2012037518 | 3/2012 |

OTHER PUBLICATIONS

InfiniBands$^{SM}$ Trade Association, InfiniBand™ Architecture Specification, vol. 1, Release 1.2.1, Nov. 2007, pp. 1-1727.
International Search Report and Written Opinion dated Oct. 11, 2012, International Application No. PCT/US2012/046225, 11 pages.
Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.
Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.
International Search Report dated Sep. 23, 2013 for Application No. PCT/US2013/040639, 10 pages.
European Patent Office, International Searching Authority, International Search Report and Written Opinion dated Nov. 30, 2012 for International Application No. PCT/US2012/046219, 18 pages.
European Patent Office, International Searching Authority, International Search Report and Written Opinion dated Sep. 12, 2012 for International Application No. PCT/US2012/040775, 13 pages.
Shanley, InfiniBand Network Architecture, Chapter: Detailed Description of the Link Layer, 2002, pp. 390-392, 485, 491-493, 537-539 (as cited in U.S. Appl. No. 13/488,221).
Bermudez, et al., On the InfiniBand Subnet Discovery Process, 2003, 6 pages.
Shanley, Tom, Infiniband Network Architecture (excerpt), Pearson Education, published 2002, p. 209-211, 393-394, 551, 554.
Shanley, InfiniBand Network Architecture, Part 5. Link and Physical Layer Descriptions, Oct. 2002, pp. 387-394, Pearson Education.
Shanley, InfiniBand Network Architecture (exerpt), 2002, pp. 204-209, 560-564, Pearson Education.
Kashyap, RFC 4392: IP over InfiniBand Architecture, Apr. 2006, pp. 1-22.
Shanley, et al., Infiniband Network Architecture, Oct. 2002, pp. 83-87, 95-102, 205-208, 403-406, Pearson Education.
State Intellectual Property Office of the People's Republic of China, Search Report for Chinese Patent Application No. 201280027279.1, Office Action dated Sep. 9, 2015, 2 pages.
State Intellectual Property Office of the People's Republic of China, Search Report for Chinese Patent Application No. 201180039807.0, Jun. 3, 2015, 2 pages.
State Intellectual Property Office of the People's Republic of China, Search Report for Chinese Patent Application No. 201180040064.9, May 29, 2015, 1 page.
State Intellectual Property Office of the People's Republic of China, Search Report for Chinese Patent Application No. 201180039850.7, May 5, 2015, 2 pages.
State Intellectual Property Office of the People's Republic of China, Search Report for Chinese Patent Application No. 201280030334.2, Office Action dated Aug. 21, 2015, 2 pages.
Shanley, Infiniband Network Architecture, (excerpt), 2002, p. 213, Pearson Education.

* cited by examiner

SYSTEM AND METHOD FOR AUTHENTICATING IDENTITY OF DISCOVERED COMPONENT IN AN INFINIBAND (IB) NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can verify trustfulness of a fabric component in an InfiniBand (IB) fabric. A subnet manager that is responsible for authenticating the fabric component using private/public key pairs. The subnet manager can first send a first encrypted message to a fabric component in the IB fabric, wherein the first encrypted message contains a token and is encrypted using a public key associated with the fabric component. Then, the fabric component is allowed to decode the first encrypted message using a private key associated with the fabric component, and to send a second encrypted message back to the subnet manager. Finally, the subnet manager can authenticate the fabric component if the second encrypted message contains correct information.

DETAILED DESCRIPTION

Described herein is a system and method that supports verifying the trustfulness of various components in an interconnected network, such as an InfiniBand (IB) network.

Figure 1:
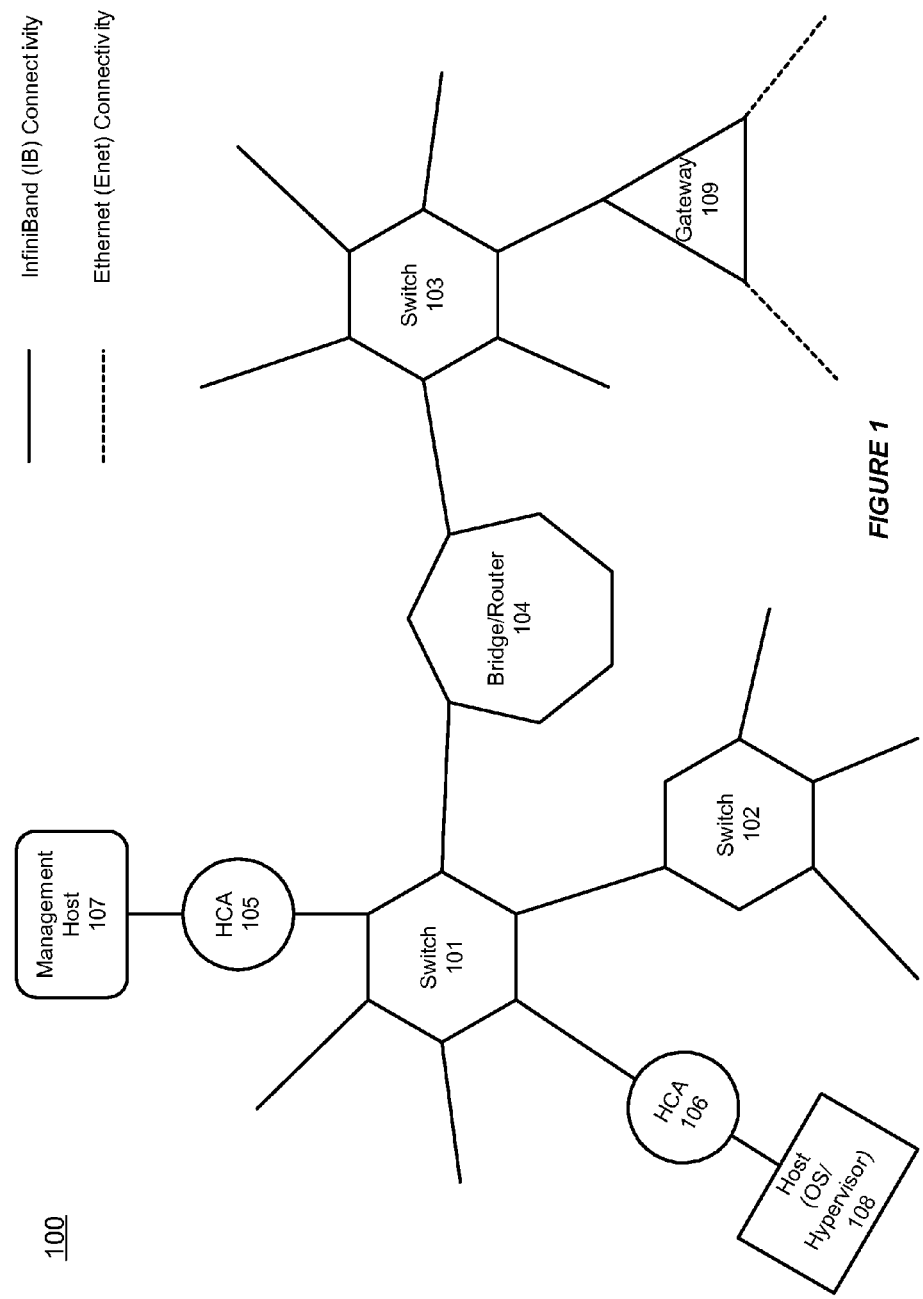
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105-106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can be only indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and ensure proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs. Each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow). Also, SMPs can use either the routing that the SM sets up based on end-port local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), maximum transmission unit (MTU), etc. to establish a communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with which other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or a HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions that the host port is supposed to be a member of. (i.e. in essence equivalent to switch enforced VLAN control in Ethernet LANs.)

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or use one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Allowing the Fabric to Constantly Verify the Trustfulness of all its Components

In accordance with an embodiment of the invention, an IB fabric can constantly verify the trustfulness of its components. A site administrator can keep track of the secure firmware state of all HCAs in the system, and can simply rely on that all relevant HCAs are operating in a secure mode. Furthermore, a physically secure data center, where correct cabling is ensured by trusted individuals, can guarantee the trustfulness of all components in the fabric. Additionally, the site/fabric administrator can ensure that the out of band management interfaces are properly password protected and otherwise rely on the switch software and firmware to be trusted.

The above simple approach is sufficient for moderately sized, static configurations, but may not be sufficient for medium to large/very large sized dynamic environments with a large number of nodes, or components. In order to automate the process of verification, the fabric components are preferably able to authenticate themselves and the firmware/software version controlling them in a way that is not vulnerable to host based spyware or rough (inconsistent) host administration.

In accordance with an embodiment of the invention, an automatic fabric components verification process involves the use of encrypted challenge/response schemes that allow the peers to verify the identity of each other without compromising themselves by sending, e.g. private passwords, before the peer has been authenticated. For the IB switches and HCA firmware, the implementation can involve SMP based protocols that can be carried out prior to the SM enabling the port for data traffic.

In a secured IB fabric, the trustfulness of the switches is built on the premise that the management access to the switch is secured and is only available to the trusted site/fabric administrators in the first place. The trustfulness of HCAs can be secured using a special host boot image-based upgrade scheme that allows private key handling to take place based on the assumptions that once the physical host is controlled by the special boot image, the HCA effectively becomes part of the fabric security domain.

Public/Private Key Based Scheme to Authenticate the Identity of Discovered Components In accordance with an embodiment of the invention, the automatic fabric components verification process can be based on the use of private/public key pairs.

Figure 2:
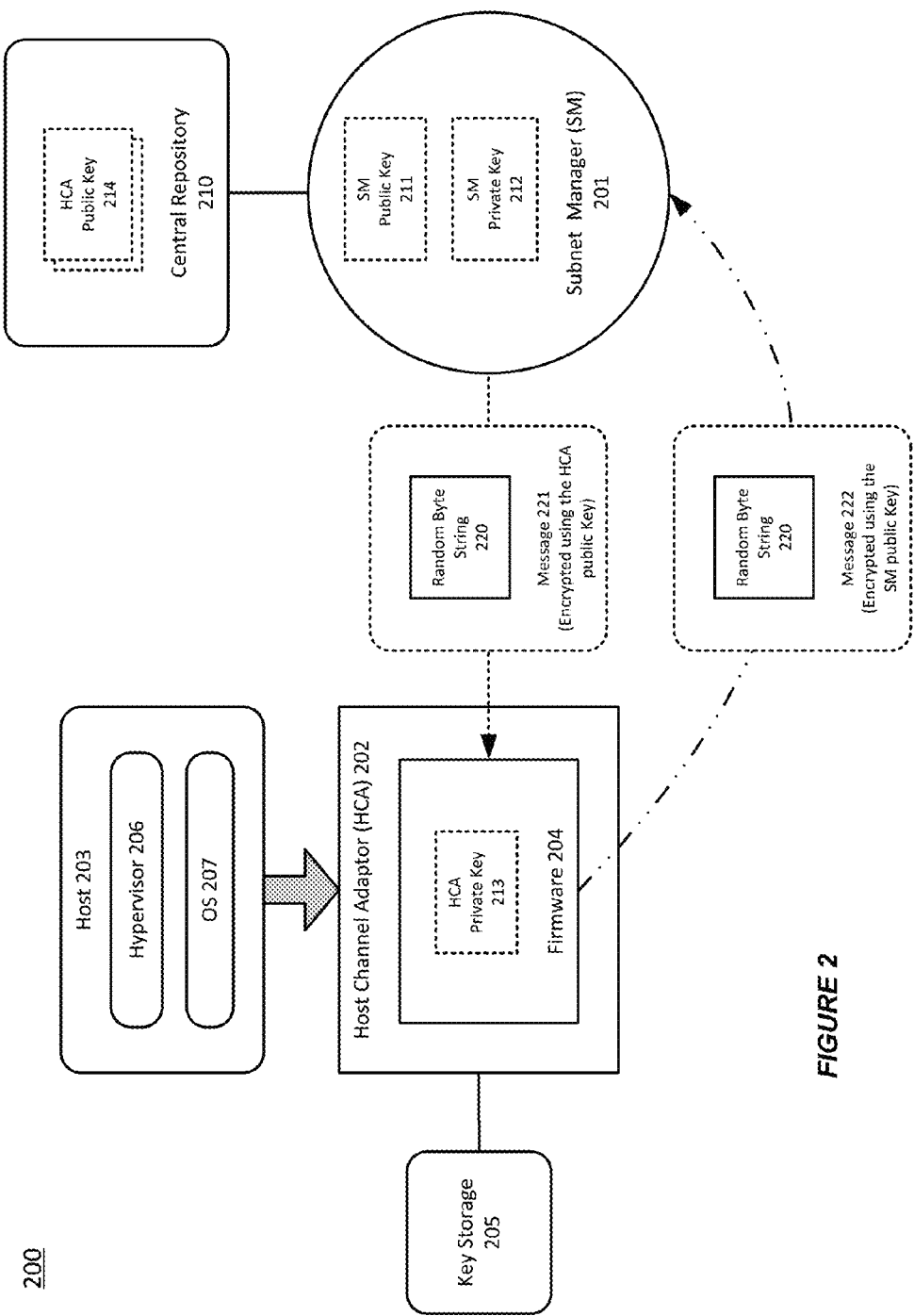
FIG. 2 shows an illustration of using a public/private key based scheme to authenticate discovered components in an IB fabric in accordance with an embodiment of the invention.

FIG. 2 shows an illustration of using a public/private key based scheme to authenticate discovered components in an IB fabric in accordance with an embodiment of the invention. As shown in FIG. 2, a SM 201 in an IB fabric 200 can be responsible for both discovering fabric components and authenticating the discovered components, such as a HCA 202 that is associated with a host 203. The SM 201 maintains a SM public key 211 and a SM private key 212, both of which are used in the process of verifying the HCA 202.

Additionally, the SM 201 can maintain a public key for each target component to be verified, such as the HCA public key 214 for the target HCA 202. There can also be a central repository 210 that stores the public keys for every component in the fabric, e.g. HCA firmware version 204, hypervisor 206/OS 207 assigned to a tenant, etc. In one example, a specific firmware version or a range of firmware versions can have a well defined public key that is distributed when the firmware version (or range) is released, installed or deployed.

Furthermore, the HCA 202 can maintain an HCA private key 213 that is associated with the HCA public key 214 for the particular HCA 202 stored on the SM 201 side. The trustfulness of the fabric component depends on the careful distribution and storage of the private keys for relevant components. One example is to have the private keys, such as the HCA private key 213, hidden in the HCA embedded firmware binary 204 (i.e. in a way that makes it very difficult to identify by "disassembly" of the HCA binary). Additional enhanced schemes can make better use of the stable storage state from the factory, such as a tamper proof non-volatile key storage 205.

The SM 201, or any other component that controls the integrity of the target HCA 202 and its firmware 204, can be configured to send an encrypted message 221 to the HCA firmware 204. The encrypted message 221 can contain a token, such as a random byte string 220, along with the SM public key 211 owned by the SM instance.

After receiving the encrypted message 221, the challenged HCA firmware 204 can decode the received encrypted message 221 and send the random byte string 220 back to the SM 201 in an encrypted response message 222 using the supplied SM public key 211. Alternatively, after decoding the received encrypted message 221, the challenged HCA firmware 204 can send a different token, such as a different byte string, back to the SM 201 as long as the SM 201 is aware of the trustfulness of the different token.

Then, the SM 201 can decode the received message 222 using its own private key 212 and authenticate the HCA firmware 204 if the SM 201 receives the correct byte string. Thus, any fake HCA firmware or driver implementation could claim to represent the same secure version ID, but may not be able to pass the challenge as long as the real firmware version's private key is not compromised.

Figure 3:
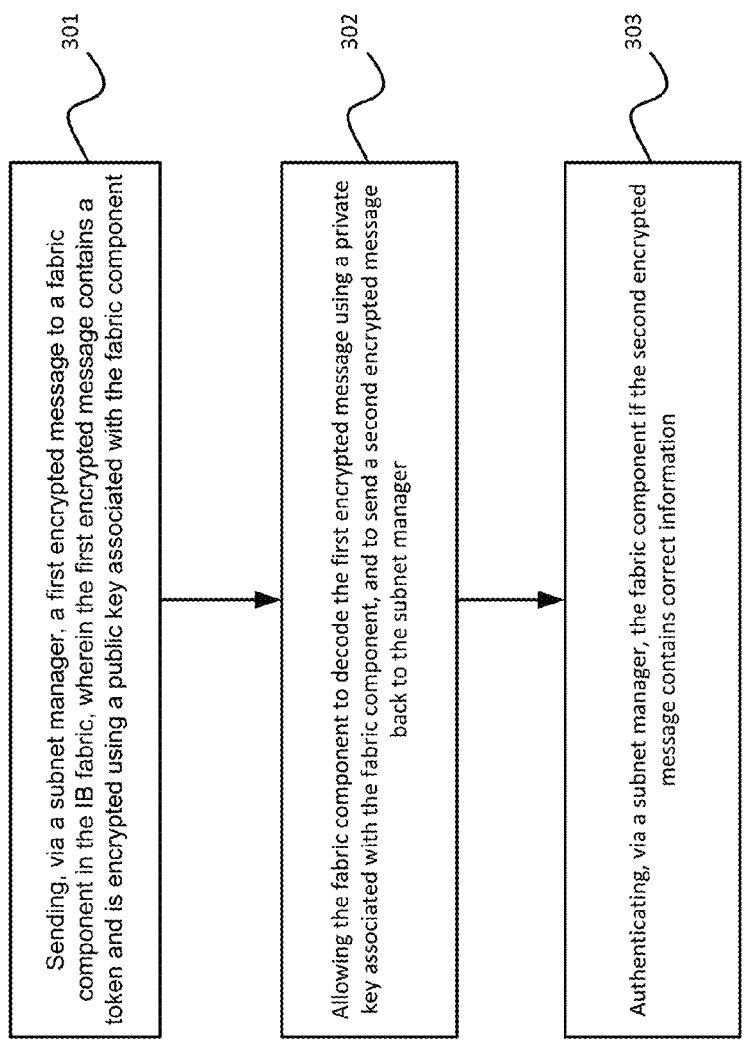
FIG. 3 illustrates an exemplary flow chart for using a public/private key based scheme to authenticate discovered components in an IB fabric in accordance with an embodiment of the invention.

FIG. 3 illustrates an exemplary flow chart for using a public/private key based scheme to authenticate discovered components in an IB fabric in accordance with an embodiment of the invention. As shown in FIG. 3, at step 301, a subnet manager can first send a first encrypted message to a fabric component in the IB fabric, wherein the first encrypted message contains a token and is encrypted using a public key associated with the fabric component. Then, at step 302, the fabric component is allowed to decode the first encrypted message using a private key associated with the fabric component, and to send a second encrypted message back to the subnet manager. Finally, at step 303, the subnet manager can authenticate the fabric component if the second encrypted message contains correct information.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for verifying trustfulness of a fabric component in an InfiniBand (IB) fabric, comprising:
    discovering, via a subnet manager executing on one or more microprocessors, a fabric component of a plurality of fabric components on a node in an IB fabric, wherein each of the plurality of fabric components is associated with a public key stored in a central repository connected to the subnet manager;
    retrieving, based on an identity of the fabric component, a public key associated with the fabric component from the central repository to the subnet manager,
    wherein the public key is distributed to the central repository when the fabric component is released, installed or deployed, and
    wherein the identity of the fabric component includes version information for the fabric component;
    sending a first encrypted message from the subnet manager to the fabric component, wherein the first encrypted message contains a first token and is encrypted using the public key associated with the fabric component, and wherein the fabric component decodes the first encrypted message using a private key associated with the fabric component;
    receiving from the fabric component to the subnet manager a second encrypted message that contains a second token;
    decoding the second encrypted message using a private key associated with the subnet manager to retrieve the second token; and
    authenticating, via the subnet manager, the fabric component if the second token is the same as the first token or is recognized by the subnet manager.

2. The method according to claim 1, wherein the fabric component is a host channel adapter (HCA) firmware or a hypervisor/OS assigned to a tenant.

3. The method according to claim 1, wherein the first token contained in the first encrypted message is a random byte string.

4. The method according to claim 1, wherein the fabric component hides the private key associated with the fabric component in an embedded firmware.

5. The method according to claim 1, wherein the fabric component stores the private key associated with the fabric component in a tamper proof non-volatile key storage.

6. The method according to claim 1, further comprising:
    sending a public key associated with the subnet manager along with the first encrypted message to the fabric component.

7. The method according to claim 6, wherein the fabric component encrypts the second encrypted message using the public key associated with the subnet manager.

8. A system for verifying trustfulness of a fabric component in an InfiniBand (IB) fabric, comprising:
    a computer with memory and one or more microprocessors;
    a subnet manager, executing on the computer, that is responsible for authenticating a fabric component in the IB fabric,
    wherein the subnet manager is configured to
        discover the fabric component from a plurality of fabric components in on a node in an IB fabric, wherein each of the plurality of fabric components is associated with a public key stored in a central repository connected to the subnet manager,
        retrieve, based on an identity of the fabric component, a public key associated with the fabric component from the central repository to the subnet manager,
        wherein the public key is distributed to the central repository when the fabric component is released, installed or deployed, and
        wherein the identity of the fabric component includes version information for the fabric component,
        send a first encrypted message from the subnet manager to the fabric component in the IB fabric, wherein the first encrypted message contains a first token and is encrypted using the public key associated with the fabric component, and wherein the fabric component decodes the first encrypted message using a private key associated with the fabric component,
        receive from the fabric component to the subnet manager a second encrypted message that contains a second token,
        decode the second encrypted message using a private key associated with the subnet manager to retrieve the second token, and
        authenticate the fabric component if the second token is the same as the first token or is recognized by the subnet manager.

9. The system according to claim 8, wherein the fabric component is a host channel adapter (HCA) firmware or a hypervisor/OS assigned to a tenant.

10. The system according to claim 8, wherein the first token contained in the first encrypted message is a random byte string.

11. The system according to claim 8, wherein the fabric component hides the private key associated with the fabric component in an embedded firmware.

12. The system according to claim 8, wherein the fabric component stores the private key associated with the fabric component in a tamper proof non-volatile key storage.

13. The system according to claim 8, wherein a public key associated with the subnet manager is sent along with the first encrypted message to the fabric component.

14. The system according to claim 13, wherein the fabric component operates to encrypt the second encrypted message using the public key associated with the subnet manager.

15. A non-transitory machine readable storage medium having instructions stored thereon that when executed cause a system to perform the steps comprising:
   discovering, via a subnet manager executing on one or more microprocessors, a fabric component of a plurality of fabric components on a node in an IB fabric, wherein each of the plurality of fabric components is associated with a public key stored in a central repository connected to the subnet manager;
   retrieving, based on an identity of the fabric component, a public key associated with the fabric component from the central repository to the subnet manager,
   wherein the public key is distributed to the central repository when the fabric component is released, installed or deployed, and
   wherein the identity of the fabric component includes version information for the fabric component;
   sending a first encrypted message from the subnet manager to the fabric component, wherein the first encrypted message contains a first token and is encrypted using the public key associated with the fabric component, and wherein the fabric component decodes the first encrypted message using a private key associated with the fabric component;
   receiving from the fabric component to the subnet manager a second encrypted message that contains a second token;
   decoding the second encrypted message using a private key associated with the subnet manager to retrieve the second token; and
   authenticating, via the subnet manager, the fabric component if the second token is the same as the first token or is recognized by the subnet manager.

16. The non-transitory machine readable storage medium of claim 15, wherein the first token contained in the first encrypted message is a random byte string.

17. The non-transitory machine readable storage medium of claim 15, wherein the fabric component hides the private key associated with the fabric component in an embedded firmware.

18. The non-transitory machine readable storage medium of claim 15, wherein the fabric component stores the private key associated with the fabric component in a tamper proof non-volatile key storage.

19. The non-transitory machine readable storage medium of claim 15, wherein a public key associated with the subnet manager is sent along with the first encrypted message to the fabric component.

* * * * *